Jan. 23, 1923.
C. GORE.
SPEED INDICATING MECHANISM.
FILED JULY 19, 1920.
1,442,937
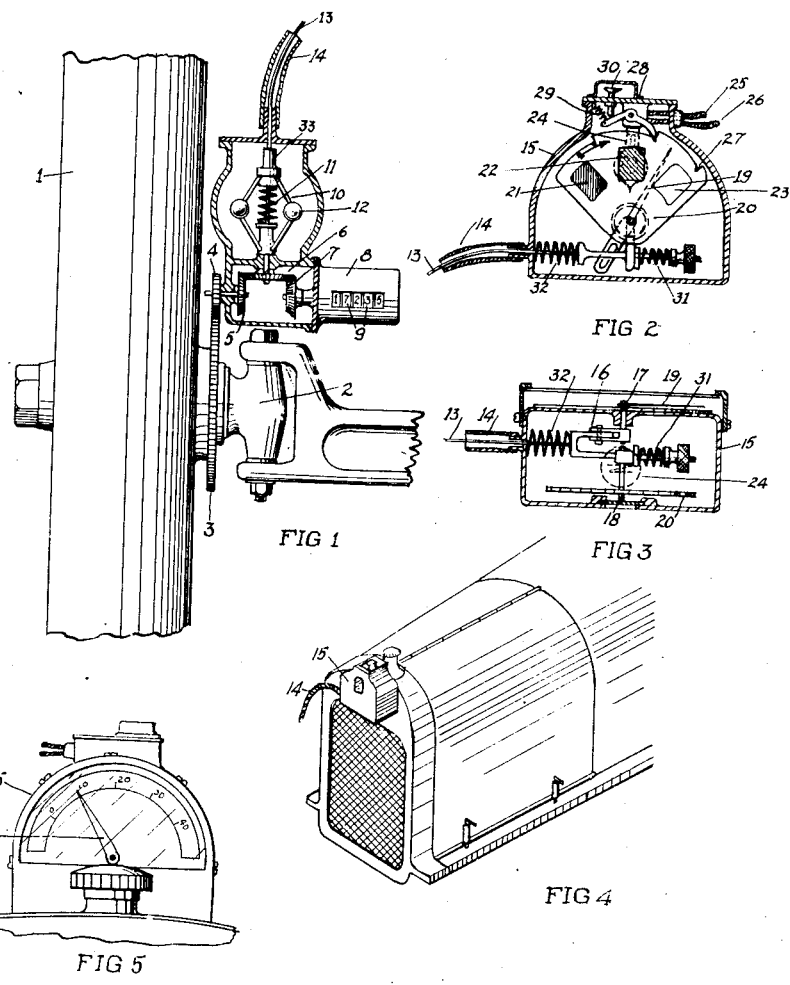
WITNESSES
INVENTOR
Charles Gore Patented Jan. 23, 1923.

1,442,937

UNITED STATES PATENT OFFICE.

CHARLES GORE, OF LOS ANGELES, CALIFORNIA.

SPEED-INDICATING MECHANISM.

Application filed July 19, 1920. Serial No. 397,339.

*To all whom it may concern:*

Be it known that I, CHARLES GORE, a subject of the King of Great Britain, residing at the city of Los Angeles, county of Los Angeles, and State of California, have discovered and invented certain new and useful Improvements in Speed-Indicating Mechanism, of which the following is a clear and exact description, enabling those skilled in the art to which it pertains to make and to use the same.

This invention relates to speed indicating mechanism, and particularly that class of speed indicating mechanism in which suitable mechanical means are employed to affect or control a plurality of colored lights, or a similar mechanism for presenting or showing a plurality of colored lights, and in combination with this mechanism, means for indicating the speed of the vehicle, in miles per hour, by an indicating hand or light mechanism, substantially as shown in the drawings hereto attached, and forming a part of this specification.

This invention relates to a class of instruments on which there have been other patents granted to me, and other patent applications are pending, as follows:

Patent No. 1,091,059, dated March 24, 1914, and still further patent granted to me No. 1,284,091, dated November 5, 1918, on further improvements and modifications of the former case.

It is an object of my invention to further simplify the mechanical construction and operation of speed indicating and registering mechanism, by employing features substantially as those shown in the accompanying drawings, forming a part of this specification, and comprising any suitable mechanically operated mechanism, such as a fly ball governor, and in combination therewith a counter to show the number of revolutions of said mechanism, corresponding to miles travelled, and a steel wire or the like attached to a sleeve, such as that represented by 33, in Figure 1, of the drawings; the operation of said fly ball governor to produce a reciprocal motion of said sleeve 33, to cause a tensile pull on the wire 13 attached thereto, and to cause, by said tensile pull, a movement of an indicating needle or hand, to register on a dial or other suitable mechanism, miles per hour; the accuracy of such indicating mechanism to be gauged by properly calibrated springs, or suitable compensating mechanism, as may be suited to the purpose, and in proximity thereto and also operated by a tensile pull of the wire 13, a reciprocal dial member 20, having a plurality of colored windows or transparent sections therein, and having around its periphery a ratchet or plurality of ratchets, allowing of movement in one direction only, such movement being wholly propulsive, or what may be termed forward motion, and each succeeding forward step or ratchet to present a different colored window or transparent section before an incandescent lamp or the like, and an opening through the housing 15 of said speed registering mechanism.

In practice, in the application of mechanical or electro-mechanical means, propulsion of speed indicating mechanism a flexible shaft or cable is generally employed, and is more or less undependable. This flexible shaft or chain is generally caused to revolve and to operate a suitable chain of gears connected with, what is known in the art, as a counter, and generally in combination with this counter a speed indicating hand, adapted to show the forward movement of the vehicle, in miles per hour.

In my invention, I provide suitable mechanical means, such as a gear or plurality of gears, adapted to drive a fly ball mechanism, commonly termed a governor, and connected therewith a form of counter, such as we represent by 8 and 9 of the attached drawings, which may be driven by a gear, such as 7, of the accompanying drawings, and registering or indicating the actual miles travelled, while the fly ball governor, represented by 10, 11 and 12, of the accompanying drawings, is designed in a manner so that rotation of such instrument may bring into action centrifugal forces, which in turn may produce an oscillating movement of the collar 33, to cause compression of the spring member 11, and to produce a tensile strain or pulling action on the wire 13 against the tension of the spring 32, within the housing 15 of the registering part of the speed indicating mechanism; this pulling action to cause the indicating needle 19 to record a certain number of miles per hour, corresponding to the strength of said tensile pull; a shaft 18 and a member 20 substantially attached thereto and adapted to reciprocate therewith, in a manner to be wholly propulsive, or in other words, a forward motion only, as represented by an arrow, on said reciprocal member, in Figure 2 of the attached drawings, and around the periphery of same a plurality of ratchets 27, a locking mechanism 28 and a spring 29, combined therewith to lock said reciprocal member, so that it may be propelled only in one direction and may be locked in the position of greatest forward movement, and may thereafter be moved further forward or in the direction of the arrow, as shown on the reciprocal member in Figure 2, but may, at no time, be released to return to its zero position, unless same shall be purposely released by the operator of said vehicle, by pressing the release mechanism 30, as shown in Figure 2 of the attached drawings.

Reference being had to the accompanying drawings, Figure 1 is a plan view of one portion of my invention, partly in section, adapted to show the portion of this device, by the modified mechanism hereby illustrated.

For the sake of simplicity and clearness, I have illustrated my invention as it might be employed in practice on an automotive vehicle.

Figure 2 illustrates the other portion of the invention connected by a suitable cable and driving wire.

Said mechanism shown is adapted to indicate the speed of the vehicle to which it is attached, both in miles per hour, by suitable mechanical means, and by means of different colored lights, all substantially as hereinbefore more fully set forth.

Figure 3 is a plan view of part of my invention, looking down on the operative parts of the speed indicating mechanism.

Figure 4 is a plan view of the finished assembled machine, as it might be applied in practice, to an automotive vehicle, and representing it in the preferred position.

Figure 5 is a view from the reverse side of Figure 4, in other words the rear portion of my indicating mechanism, showing the manner in which it indicates mechanically the miles per hour, in combination with the other features elsewhere shown and described.

1 represents a tire of an automotive vehicle; 2 the steering knuckle; 3 a driving gear attached to the rotating element or wheel, to which the tire 1 is attached. 4 represents a small driven gear in mesh with gear 3 and driven thereby. 5 is a suitable gear, preferably a bevel gear, adapted to engage and mesh with a further pinion or miter gear 6. 7 is a still further bevel or miter gear, preferably similar in character to 5. 8 indicates a housing containing suitable speed accounting mechanism, and gears, operated thereby, represented by 9. 10 is a fly ball governor or a similar centrifugal engine or machine, ordinarily held in an elongated position by spring 11, so that the balls 12 may be retained close to the spring 11, and only thrown therefrom by centrifugal forces which are great enough to compress said spring 11, thus operating by exerting a pull or tensile stress upon a wire cable 13, within a flexible tube, 14. 15 is a housing of the speed indicating mechanism proper, to which the flexible tube 14 is attached, and into which the steel cable or wire 13 extends and is connected, as shown by 16, to a plurality of shafts 17 and 18, in a manner so that shaft 17 operates an indicating needle 19 and shaft 18 operates a dial or sector 20, in a manner to present different colored sections, 21, 22 and 23, through which an incandescent lamp or the like, 24, may shine, particularly to render same visible after nightfall. Electric current may be supplied through wires such as 25 and 26, and suitably controlled in a manner best suited to the purpose. 27 represents a form of ratchet or the like, accompanied with a reciprocal dial member 20. The locking mechanism 28, operated by the spring 29, is adapted to drop into the ratchet position 27, as the reciprocal member 20 is caused to be propelled or reciprocated in the proper direction by a pulling effort being exerted on the wire or cable member 13.

It will thus be seen that the greater pull exerted on the cable 13, the greater will be the movement of the dial member 20, and if same is caused to advance or reciprocate in a manner to present new windows or lights of a different color, said locking mechanism 28 shall lock successively on each step 27 of the said reciprocal member 20, and prevent any return movement of such reciprocal member, until said lock mechanism 28 shall be released by pressure being exerted on the releasing mechanism 30, when the reciprocal dial mechanism 20 shall be caused to return to its neutral position by reason of the spring 31 exerting pressure thereon, in the manner substantially as that shown in modified form, in the accompanying drawing. 32 is a suitable spring member, adapted to return the needle or speed indicating hand 19 to its zero position, as the pulling or tensile effort is released gradually from the cable or wire 13.

An object of my invention is to cause the operation of my speed registering mechanism, by means of a tensile pull exerted on a steel wire or cable; said tensile pull operating against a calibrated spring or a plurality of springs, substantially as shown, so that when the tensile pull is released from the said wire or cable, it may return to its starting point, known as a neutral position.

In the practice of my invention I employ a centrifugal machine, known as a fly ball governor, in which certain weights are thrown out laterally, by centrifugal force, upon operation of the machine, and causing this so called fly ball governor to perform the function hereinbefore described, of exerting a tensile pull upon said steel wire or cable.

It is a still further object of my invention that said fly ball governor or similar machine caused to operate by centrifugal forces, shall be placed in proximity to one of the rotative wheels of an automotive vehicle and attached thereto and connected by gears, in a manner to cause its operation; all substantially as shown in Figure 1 of the drawings, forming a part of this specification; and in combination with this mechanism, a counter adapted by means of the revolution of said automotive wheel, to indicate the number of miles travelled during any time.

It is a still further object of my invention that the wire represented by 13 of the drawings should be adapted to produce a tensile pull upon said elements, as represented by 31, 32, 16, 17, 18, 19 and 20 of the accompanying drawings; for the purpose of indicating, by suitable means, the speed in miles per hour, by a hand or indicating needle, and to represent the speed in miles per hour, by presenting a colored window before an incandescent lamp or other suitable source of light.

I claim:

1. A speed indicating mechanism, comprising a speed registering instrument to which a suitable wire extends, said wire being actuated by external means to exert a tensile pull in direct proportion to the speed of a vehicle employing said mechanism, a reciprocal element operated by said wire having a plurality of colored windows therein, a source of light which may shine through said colored windows, and a ratchet mechanism, in combination with said reciprocal member bearing the colored window in a fashion to allow of movement in one direction only, said movement being wholly propulsive, and locking at each succeeding forward step, no return being possible until said ratchet mechanism shall have been released.

2. A speed indicating and registering device comprising a protecting cable, a steel wire extending through said cable, said wire being adapted to transmit a tensile pull, a mechanism for exerting tensile pull on said wire adapted to vary the pull on speed variation, a reciprocal member, a plurality of colored windows therein, ratchets around a periphery of said reciprocal member and means operating with said ratchet for locking said reciprocal member in each successive forward position, no return of the same being possible until manually released.

3. A speed indicating and registering mechanism, comprising a housing, a source of light therein, a reciprocal sector, a plurality of colored windows within said sector, a ratchet around the periphery of said sector, means for reciprocating the second mechanism, a locking means in combination with the ratchet around the periphery, allowing only for propulsive movement, such propulsive movement being obtained by a tensile pulling effort exerted by a suitable wire from an external source, adapted and arranged substantially as shown in the drawings hereto attached.

4. A speed indicating mechanism comprising a housing, a source of light therein, a reciprocal sector, a plurality of differently colored windows within said sector; means for advancing said sector in one direction by a tensile pull exterted from an external source whereby the differently colored windows may be successively positioned to expose the source through said colored windows; means acting on said sector for holding it against retrograde movement in various advanced positions adapted to be operated to release said sector; and means for automatically returning the sector to its normal position.

CHARLES GORE.